(12) United States Patent
Weber et al.

(10) Patent No.: US 10,299,175 B2
(45) Date of Patent: May 21, 2019

(54) METHODS FOR OPERATING A FIRST BASE STATION AND A SECOND BASE STATION IN A RADIO COMMUNICATION SYSTEM, FIRST BASE STATION AND SECOND BASE STATION THEREOF

(71) Applicant: Alcatel Lucent, Boulogne Billancourt (FR)

(72) Inventors: Andreas Weber, Stuttgart (DE); Hajo-Erich Bakker, Stuttgart (DE); Siegfried Klein, Stuttgart (DE)

(73) Assignee: Alcatel Lucent, Nozay (FR)

( * ) Notice: Subject to any disclaimer, the term of this patent is extended or adjusted under 35 U.S.C. 154(b) by 189 days.

(21) Appl. No.: 15/129,901

(22) PCT Filed: Mar. 6, 2015

(86) PCT No.: PCT/EP2015/054730
§ 371 (c)(1),
(2) Date: Sep. 28, 2016

(87) PCT Pub. No.: WO2015/150020
PCT Pub. Date: Oct. 8, 2015

(65) Prior Publication Data
US 2017/0164248 A1 Jun. 8, 2017

(30) Foreign Application Priority Data
Mar. 31, 2014 (EP) ..................... 14305464

(51) Int. Cl.
*H04W 36/00* (2009.01)
(52) U.S. Cl.
CPC ... *H04W 36/0072* (2013.01); *H04W 36/0094* (2013.01)
(58) Field of Classification Search
CPC combination set(s) only.
See application file for complete search history.

(56) References Cited

U.S. PATENT DOCUMENTS

| 6,119,005 A | 9/2000 | Smolik |
| 2007/0060183 A1 | 3/2007 | Moulsley et al. |

(Continued)

FOREIGN PATENT DOCUMENTS

| EP | 1 253 792 A1 | 10/2002 |
| JP | 2013-132070 | 7/2013 |

(Continued)

OTHER PUBLICATIONS

International Search Report for PCT/EP2015/054730 dated May 4, 2015.

*Primary Examiner* — Mark H Rinehart
*Assistant Examiner* — Kenneth P Hunt
(74) *Attorney, Agent, or Firm* — Fay Sharpe LLP

(57) ABSTRACT

The embodiments of the invention relate to a method for operating a first base station (BS1) in a radio communication system (RAN). The method contains transmitting first reference signals via a first radiation beam (BM1-BS1) being directed towards a first direction and at least second reference signals via at least one second radiation beam (BM2-BS1, . . . , BM5-BS1) being directed towards at least one second direction. The method further contains receiving for a hand over of a mobile station (MS) from a second base station (BS2) being a serving base station of the mobile station (MS) to the first base station (BS1) an indication for a radiation beam being selected from a group of radiation beams comprising the first radiation beam (BM1-BS1) and the at least one second radiation beam (BM2-BS1, . . . , BM5-BS1) for applying the selected radiation beam as an initial radiation beam at the first base station (BS1) for serving the mobile station (MS). The method even further contains scheduling radio resources for the initial radiation beam for serving the mobile station (MS) based on the indication. The embodiments further relate to a method for operating a second base station (BS2) in a radio communi- (Continued)

cation system (RAN), to a first base station (BS1) for operation in a radio communication system (RAN) and to a second base station (BS2) for operation in a radio communication system (RAN).

8 Claims, 7 Drawing Sheets

(56) References Cited

U.S. PATENT DOCUMENTS

| | | |
|---|---|---|
| 2007/0070957 A1 | 3/2007 | Schwartz |
| 2009/0264118 A1 | 10/2009 | Robson |
| 2010/0159930 A1 | 6/2010 | Hagerman et al. |
| 2011/0130143 A1 | 6/2011 | Mod et al. |
| 2012/0208543 A1 | 8/2012 | Takagi |
| 2013/0083774 A1* | 4/2013 | Son .................. H04W 36/0055 370/331 |
| 2014/0073329 A1 | 3/2014 | Kang |
| 2014/0362786 A1* | 12/2014 | Kelman .............. H04W 52/262 370/329 |
| 2017/0006539 A1* | 1/2017 | Kakishima ........... H04B 7/0478 |
| 2017/0055187 A1* | 2/2017 | Kang ................ H04W 36/0069 |
| 2017/0215117 A1* | 7/2017 | Kwon ...................... H04B 7/04 |
| 2017/0339574 A1* | 11/2017 | Zhang ................... H04W 16/28 |
| 2018/0124766 A1* | 5/2018 | Nagaraja ............... H04L 5/0048 |

FOREIGN PATENT DOCUMENTS

| | | |
|---|---|---|
| KR | 2013-0034827 | 4/2013 |
| KR | 2013-0084340 | 7/2013 |
| KR | 2013-0132339 | 12/2013 |
| KR | 2014-0034509 | 3/2014 |
| WO | 2013/024852 | 2/2013 |
| WO | WO 2013/017108 A1 | 2/2013 |
| WO | 2013/048212 | 4/2013 |

* cited by examiner

METHODS FOR OPERATING A FIRST BASE STATION AND A SECOND BASE STATION IN A RADIO COMMUNICATION SYSTEM, FIRST BASE STATION AND SECOND BASE STATION THEREOF

FIELD OF THE INVENTION

The present invention relates to a handover or cell re-association in a radio communication system and, more particularly but not exclusively, to a handover or cell re-association of a mobile station to a base station using at least two vertical radiation beams.

BACKGROUND

This section introduces aspects that may be helpful in facilitating a better understanding of the invention. Accordingly, the statements of this section are to be read in this light and are not to be understood as admission about what is in the prior art.

Future radio communication networks may have a mixture of conventional first base stations being adapted to transmit radiation beams to several so-called horizontal directions but to only one so-called vertical direction and further more sophisticated second base stations being adapted to transmit so-called horizontal radiation beams to several horizontal directions and further being adapted to transmit so-called vertical radiation beams to several vertical directions. Horizontal direction means in the following a direction, which may be defined by an azimuth angle between a surface normal of a radiating surface of an antenna system and a beam direction of a horizontal beam. Vertical direction means in the following a direction, which is defined by an elevation angle between the surface normal of the radiating surface of the antenna system and a beam direction of a vertical beam.

When such a second base station transmits time multiplexed common pilots a mobile station which arrives in a coverage area of the second base station would observe only an aggregated vertical radiation beam by measuring the different pilots over a certain period of time and would be not aware of the several vertical radiation beams. Thus, the mobile station or a base station currently serving the mobile station may select a target radio cell of a further second base station for a handover, although one of the several vertical radiation beams of the second base station is directly pointing to the mobile station. Furthermore, the serving base station might not know an impact of interference caused by the several vertical radiation beams at various locations in its own serving radio cell.

In current 3GPP standards (3GPP=3rd Generation Partnership Project), only two radiation beams with a first and a second measurement area can be supported based on time domain RS and CQI measurements (RS=Reference Symbols, CQI=Channel Quality Identifier) which have been originally introduced for eICIC (eICIC=enhanced Inter Cell Interference Coordination). Instead of using the two measurement areas for a so-called ABS (ABS=Almost Blank Subframe) and a so-called non-ABS, the two measurement areas may be used for upper beam and lower beam. However, in current 3GPP standards such two measurement areas are only supported for CQI measurements inside a current serving cell and not for a handover to a target cell. Furthermore, not more than two radiation beams can be supported by such a technical consideration.

The best existing solution in case of having more than two vertical radiation beams at a target base station would be to measure average signal strength over all the vertical radiation beams which may lead to a non-optimal handover decision and a non-optimal radio cell selection and cell association. Another solution would be to define every of the vertical radiation beams as a separate radio cell. However, this would lead to many handovers and to a non optimal throughput performance, because a time consuming handover would be required in order to use the optimal beam and a fast switching between the radiation beams would be not possible.

US 2009/0264118 A1 discloses a method of generating neighbor lists in a radio communication network comprising user terminals and base stations defining sectored or omni-directional radio cells. The method comprises the steps of receiving radio channel measurements from at least some of the user terminals, creating a first table which comprises for at least some of the user terminals the corresponding radio channel measurement in relation to different radio cells, processing the first table to generate a cell coupling matrix comprising coupling figures between different pairs of cells and obtaining for a certain cell a neighbor list which contains neighbor that have a coupling figure greater than a given threshold.

SUMMARY

Thus, an object of the embodiments of the invention is to provide an improved handover or cell re-association in a radio communication system and especially in those radio communication systems which consist of a mixture of radio cells being served by several vertical radiation beams and of further radio cells being served by only one vertical radiation beam. A further object of the embodiments of the invention is to reduce an impact of the interference of the various vertical radiation beams of a first radio cell within a coverage area of a neighbouring second radio cell for improving a scheduling of mobile stations by a base station which serves the second radio cell.

The object is achieved by a method for operating a first base station in a radio communication system. The method contains transmitting by an antenna array first reference signals via a first radiation beam, which is directed towards a first direction and transmitting at least second reference signals via at least one second radiation beam, which is directed towards at least one second direction. The method further contains receiving for a handover of a mobile station from a second base station being a serving base station of the mobile station to the first base station an indication for one of the first radiation beam and of the at least one second radiation beam for applying the one of the first radiation beam and of the at least one second radiation beam as an initial radiation beam at the first base station for serving the mobile station. The method further contains scheduling radio resources for the initial radiation beam for serving the mobile station based on the indication.

The object is further achieved by a method for operating a second base station in a radio communication system. The method contains receiving from a mobile station being served by the second base station quality information about at least one of a first radiation beam and of at least one second radiation beam. The first radiation beam is directed by at least one first base station as a neighboring base station of the second base station towards a first direction and transmitted by an antenna array and the at least one second radiation beam is directed by the at least one first base station to at least one second direction and transmitted by the antenna array. The method further contains determining based on the quality information one of the first radiation beam and of the at least one second radiation beam as an initial radiation beam at the first base station for serving the mobile station after a handover from the second base station to the first base station. The method even further contains transmitting an indication of the selected initial radiation beam to the first base station.

The object is even further achieved by a first base station for operation in a radio communication system. The first base station contains means for transmitting by an antenna array first reference signals via a first radiation beam being directed towards a first direction and at least second reference signals via at least one second radiation beam being directed towards at least one second direction. The first base station further contains means for receiving for a handover of a mobile station from a second base station being a serving base station of the mobile station to the first base station an indication for one of the first radiation beam and of the at least one second radiation beam for applying the one of the first radiation beam and of the at least one second radiation beam as an initial radiation beam at the first base station for serving the mobile station. The first base station even further contains means for scheduling radio resources for the initial radiation beam for serving the mobile station based on the indication.

In embodiments, the means for transmitting the first reference signals and the at least second reference signals may correspond to any transmitter unit, transmitter module, transceiver unit, transceiver module etc. which contains a digital processing part and an analogue processing part with a power amplifier. Hence, in embodiments the means for transmitting the first reference signals and the at least second reference signals may contain an input for the first reference signals and the at least second reference signals, an algorithm which modulates at least one signal with the first reference signals and/or the at least second reference signals and generates at least one radio frequency signal, a power amplifier which amplifies the at least one radio frequency signal, and an output for the at least one radio frequency signal. In some embodiments the means for transmitting the first reference signals and the at least second reference signals can be partly implemented in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processing unit.

In embodiments, the means for receiving the indication may correspond to any receiver, transceiver, receiver unit, transceiver module etc. Hence, in embodiments the means for receiving the indication may contain an input for received signals such as radio frequency signals which are modulated with the indication, a pre-amplifier for the received signals, an algorithm, which extracts the indication from the received signals, and an output for the indication. In some embodiments the means for receiving can be implemented partly in terms of a computer program and a hardware component on which the computer program is executed, such as a DSP, an ASIC, an FPGA or any other processing unit.

In embodiments, the means for scheduling the radio resources may correspond to any scheduling unit, scheduling module, scheduler, MAC scheduler (MAC=Media Access Control) etc. Hence, in embodiments the means for scheduling the radio resources may contain an input for information such as pending data for mobile stations, quality parameters of radio links between a base station and the mobile stations, QoS parameters of the pending data, subscription parameters of users of the mobile stations such as guaranteed data rates etc., an algorithm for selecting and distributing available radio resources across the mobile stations, and an output for a mapping between selected radio resources and mobile stations. In some embodiments the means for scheduling the radio resources can be implemented in terms of a computer program and a hardware component on which the computer program is executed, such as a DSP, an ASIC, an FPGA or any other processing unit.

The object is even further achieved by a second base station for operation in a radio communication system. The second base station contains means for receiving from a mobile station being served by the second base station quality information about at least one of a first radiation beam being directed by at least one first base station as a neighboring base station of the second base station towards a first direction and of at least one second radiation beam being directed by the at least one first base station to at least one second direction. The second base station further contains means for determining based on the quality information one of the first radiation beam and of the at least one second radiation beam as an initial radiation beam at the first base station for serving the mobile station after a handover from the second base station to the first base station. The second base station even further contains means for transmitting an indication of the selected initial radiation beam to the first base station.

In embodiments, the means for receiving the quality information may correspond to any receiver, transceiver, receiver unit, transceiver module etc. Hence, in embodiments the means for receiving the quality information may contain an input for received signals such as radio frequency signals which are modulated with the quality information, a pre-amplifier for the received signals, an algorithm, which extracts the quality information from the received signals, and an output for the quality information. In some embodiments the means for receiving the quality information can be implemented partly in terms of a computer program and a hardware component on which the computer program is executed, such as a DSP, an ASIC, an FPGA or any other processing unit.

In embodiments, the means for determining the initial radiation beam may correspond to any determination unit, determination module, etc. Hence, in embodiments the means for determining the initial radiation beam may contain an input for the quality information of the first radiation beam and of the at least one second radiation beam, an algorithm, which determines the initial serving radiation beam using the quality information of the first radiation beam and of the at least one second radiation beam, and an output for an identifier of the determined initial serving radiation beam. In some embodiments the means for determining the initial radiation beam can be implemented in terms of a computer program and a hardware component on which the computer program is executed, such as a DSP, an ASIC, an FPGA or any other processing unit.

In embodiments, the means for means for transmitting the indication may correspond to any transmitter unit, transmitter module, transceiver unit, transceiver module etc. which contains a digital processing part and an analogue processing part with a power amplifier. Hence, in embodiments the means for transmitting the indication may contain an input for the indication, an algorithm which modulates a signal with the indication and generates a radio frequency signal, a power amplifier which amplifies the radio frequency signal, and an output for the radio frequency signal. In some embodiments the means for transmitting the indication can be partly implemented in terms of a computer program and a hardware component on which the computer program is executed, such as a DSP, an ASIC, an FPGA or any other processing unit.

The embodiments provide an advantage of an improved handover or cell re-association in radio communication systems and especially in those radio communication systems, which consist of a mixture of radio cells being served by several vertical radiation beams and of further radio cells being served by only one vertical radiation beam. When a serving radio link for the mobile station has been transferred in such a way from the second base station as a former serving base station to the first base station as a target base station and new serving base station, the new serving base station is able to serve and schedule in a fast way and at least for a first scheduling period by a vertical radiation beam of sufficient quality. Thereby, an overall data throughput of the radio communication system may be increased. Especially mobile stations, which are located at a cell border may be served with a higher data throughput. According to a further advantage, the embodiments are independent of a special design of the first reference signals and of the at least second reference signals for vertical radiation beams as long as a mobile station is able to make separate measurements for the vertical radiation beams of a radio cell of the at least one neighboring base station.

In one embodiment, the indication may contain an identifier of the one of a group of radiation beams which contains the first radiation beam and the at least one second radiation beam.

In a preferred embodiment, the indication may further contain quality information of the one radiation beam of the group of the radiation beams.

This means the indication may contain only the identifier or in a preferred way the identifier and the quality information.

In a further embodiment the method further contains the steps of receiving at the first base station from the mobile station further quality information for the first radiation beam and for the at least second radiation beam and determining at the first base station an alternative radiation beam for scheduling the mobile station based on the further quality information, when the alternative radiation beam provides a higher quality than the initial serving radiation beam.

Preferably, the higher quality corresponds to a larger data throughput for scheduling the mobile station via the alternative radiation beam than scheduling the mobile station via the initial serving radiation beam.

In an even further embodiment, the method further contains the steps of receiving at the first base station a request from the second base station for first radio resource information for a transmission of the first reference signals via the first radiation beam and for at least one second radio resource information for a transmission of the at least second reference signals via the at least one second radiation beam, and transmitting from the first base station to the second base station a reply, which contains the first radio resource information and the at least one second radio resource information.

Preferably, the first radiation beam is aligned with respect to a first elevation angle and the at least one second radiation beam is aligned with respect to a second elevation angle.

According to further embodiments the transmitting of the first reference signals and the at least second reference signals contains transmitting the first reference signals and the at least second reference signals by at least two time resources, by at least two frequency resources, by at least two code resources or by at least two sets of time resources and frequency resources.

According to a further embodiment, the method further contains the steps of transmitting from the second base station to the first base station a request for information about a usage of the first radiation beam and of the at least one second radiation beam by the at least one first base station, and receiving at the second base station from the first base station a reply with the information.

Preferably the usage information contains information about a scheduling of further mobile stations at the first base station via the first radiation beam and/or via the at least one second radiation beam.

The further embodiment provides as a further advantage knowledge at the serving base station of the mobile station about the interference, which is caused by the various vertical radiation beams of the neighbouring base station. Thereby, the serving base station may be able to optimize a scheduling of the mobile station in its own serving radio cell. An optimized scheduling yields a higher throughput in the serving radio cell.

According to an even further embodiment the method further contains the steps of scheduling at the second base station the mobile station for downlink data based on the quality information in a time slot, when a usage of one of the first radiation beam and of the at least one second radiation beam by the first base station fulfills a predefined criterion and when a handover decision for the mobile station is pending.

Preferably the predefined criterion is an availability of information at the second base station that one of the first radiation beam and of the at least one second radiation beam with a largest interference at a location of the mobile station is currently not used.

According to a further embodiment, the method further contains the steps of preventing at the second base station a scheduling of the mobile station for uplink data in at least one time slot, when the usage of one of the first radiation beam and of the at least one second radiation beam fulfills the predefined criterion and when during the at least one time slot uplink data are transmitted from at least one further mobile station to the first base station.

Further advantageous features of the embodiments of the invention are defined in the dependent claims and are described in the following detailed description.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

The description and drawings merely illustrate the principles of the invention. It will thus be appreciated that those skilled in the art will be able to devise various arrangements that embody the principles of the invention. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions.

A splitting of processing functions across processing units shown in the Figures is not critical, and as can be understood by those skilled in the art that the number of processing units, the number of processing functions and an allocation of the processing functions to the processing units may vary without departing from the scope of the embodiments of the invention as defined in the appended claims. The number of the steps for performing the method(s) is not critical, and as can be understood by those skilled in the art that the number of the steps and the sequence of the steps may vary without departing from the scope of the embodiments of the invention as defined in the appended claims.

Figure 1:
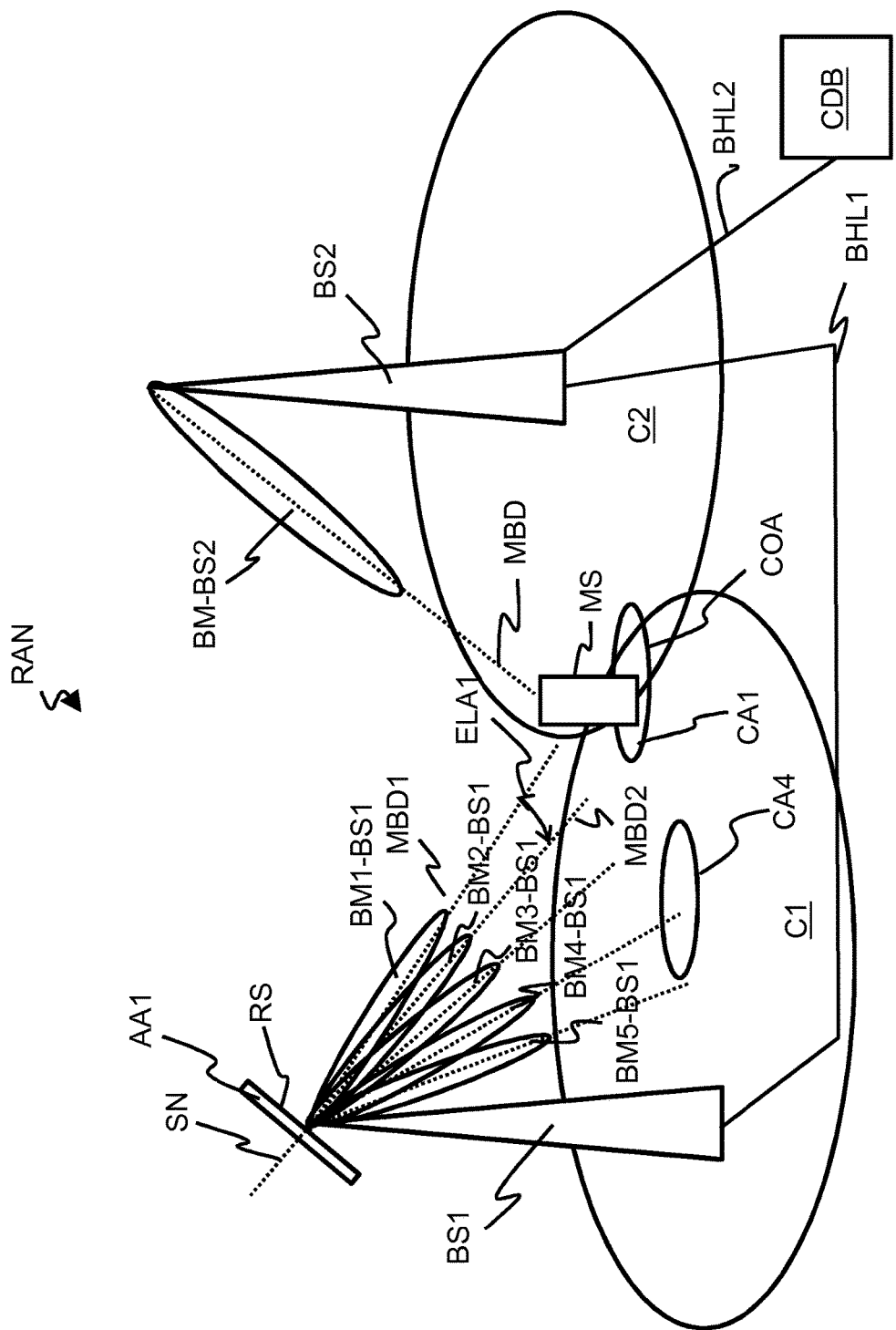
FIG. 1 shows schematically a radio access network which contains a first base station adapted to transmit several vertical radiation beams, a second base station adapted to transmit a single vertical radiation beam and a mobile station, which is located between the first base station and the second base station.

FIG. 1 shows schematically a radio access network RAN which contains a first base station BS1 which is adapted to transmit several vertical radiation beams BM1-BS1, . . . , BM5-BS1 by applying for example a so-called vertical pre-coding.

Alternatively, the first base station BS1 may be adapted to transmit the several vertical radiation beams BM1-BS1, . . . , BM5-BS1 and in addition several horizontal radiation beams according to a so-called MIMO transmission scheme (MIMO=Multiple Input Multiple Output) (the several horizontal radiation beams are not shown in FIG. 1 for simplification.

The radio access network RAN further contains a second base station BS2 which is adapted to transmit a single vertical radiation beam BM-BS2 and may be adapted to transmit several horizontal radiation beams, which are not shown in FIG. 1 for simplification.

The radio access network RAN even further contains a mobile station MS which is located at a cell border of a second radio cell C2 of the second base station BS2 and in a cell overlap area COA between a first radio cell C1 of the first base station BS1 and the second radio cell C2.

The radio access network RAN may be connected to a core network of a radio communication system, which is also not shown for simplification. The radio access network RAN may be for example a radio access network of a cellular mobile communication system such as GSM/GPRS (GSM=Global System for Mobile Communication, GPRS=General Packet Radio Service), UMTS (UMTS=Universal Mobile Telecommunication Systems), HSPA (HSPA=High Speed Packet Access), LTE (LTE=Long Term Evolution) or LTE-Advanced, which are all standardized by 3GPP. Alternatively, the radio access network RAN may be a WLAN (WLAN=Wireless Local Area Network) which may be based on one of the IEEE 802.11 standards. In a further alternative, the radio access network RAN may be for example a WiMAX network (WiMAX=Worldwide Interoperability for Microwave Access) based on one of the IEEE 802.16 standards for enabling a delivery of last mile wireless broadband access as an alternative to cable and DSL (DSL=Digital Subscriber Line). In even further alternatives, the radio access network RAN1 may be based on one of the CDMA family of standards including cdmaOne, CDMA2000, and CDMA2000 EV-DO which are standardized by 3GPP2 (3GPP2=3rd Generation Partnership Project 2).

The term "base station" may be considered synonymous to and/or referred to as a base transceiver station, access point base station, access point, macro base station, macrocell, micro base station, microcell, femtocell, picocell etc. and may describe equipment that provides wireless connectivity via one or more radio links to one or more mobile stations. The first base station BS1 and the second base station BS2 may be for example an LTE Node B, an IEEE 802.11 access point, a WiMAX base station etc.

The term "macro base station" may be considered synonymous to and/or referred to a base station, which provides a radio cell having a size in a range of several hundred meters up to several kilometres. A macro base station usually has a maximum output power of typically tens of watts.

The term "micro base station" may be considered synonymous to and/or referred to a base station, which provides a radio cell having a size in a range of several tens of meters up to hundred meters. A micro base station usually has a maximum output power of typically several watts.

The term "macro cell" may be considered synonymous to and/or referred to a radio cell, which provides the widest range of all radio cell sizes. Macro cells are usually found in rural areas or along highways and are usually operated with transmit powers in a range of several 10 Watt.

The term "micro cell" may be considered synonymous to and/or referred to a radio cell in a cellular network served by a low power cellular base station, covering a limited area (smaller than an area of a macro cell) such as a mall, a hotel, or a transportation hub. A microcell is referred to a group of radio cells, which contain pico cells and femto cells.

The term "pico cell" may be considered synonymous to and/or referred to a small cellular base station typically covering a small area, such as in-building (offices, shopping malls, train stations, stock exchanges, etc.), or more recently in-aircraft. In cellular networks, pico cells are typically used to extend coverage to indoor areas where outdoor signals do not reach well, or to add network capacity in areas with very dense phone usage, such as train stations.

The term "femto cell" may be considered synonymous to and/or referred to a small, low-power cellular base station, typically designed for use in a home or small business. A broader term which is more widespread in the industry is small cell, with femto cell as a subset.

The term "mobile station" may be considered synonymous to, and may hereafter be occasionally referred to, as a mobile unit, mobile user, access terminal, user equipment, subscriber, user, remote station or a small cell, pico cell or femto cell when located in a moving vehicle such as a bus, a train or even a car. Each of the mobile stations UE1, UE2 may be for example a cellular telephone, a smart phone, a portable computer, a pocket computer, a hand-held computer, a personal digital assistant, a moving base station, a smart watch, a head mounted display such as a Google glass or a car-mounted mobile device such as a repeater or relay.

The term "radio cell" may be considered synonymous to and/or referred to as radio cell, cell, radio sector, sector etc.

The first base station BS1 contains an antenna array AA1. A surface normal SN with respect to a radiating surface RS of the antenna array AA1 is used for defining elevation angles of vertical radiation beams BM1-BS1, BM2-BS1, BM3-BS1, BM4-BS1, BM5-BS1, which are transmitted by the antenna array AA1 of the first base station BS1.

The first base station BS1 transmits a first vertical radiation beam BM1-BS1 to a first beam direction by applying a first elevation angle ELA1. The first elevation angle ELA1 may be defined as an angle between the surface normal SN and a beam direction MBD1 of the first vertical radiation beam BM1-BS1. The first base station BS1 further transmits a second vertical radiation beam BM2-BS1 to a second beam direction by applying a second elevation angle. The second elevation angle ELA2 may be zero because the surface normal SN and a beam direction MBD2 of the second vertical radiation beam BM2-BS1 may have a same direction as shown exemplarily in FIG. 1. In a same way, the first base station BS1 applies further elevation angles (not shown for simplification) for further three vertical radiation beams BM3-BS1, BM4-BS1, BM5-BS1, which are directed to further beam directions. The first base station BS1 may alternatively transmit only two vertical radiation beams, more than five vertical radiation beams such as eight vertical radiation beams.

The first beam direction points to a first coverage area CA1 as a result of the first elevation angle, the second beam direction points to a second coverage as a results of the second elevation angle and so on (only a further coverage area CA4 for the fourth vertical radiation beam BM4-BS1 is shown in FIG. 1 for simplification). Thereby, the first coverage area CA1 and the at least second coverage area are located at different radial positions within the first radio cell C1 of the first base station BS1. Radial position means for example a position with a specific mean distance to a centre of the first radio cell C1 or with a specific mean distance to a location of an antenna mast for the antenna array AA1.

The second base station BS2 may have adjusted a beam direction MBD of the single vertical radiation beam BM-BS2 towards the mobile station MS for serving the mobile station MS via the vertical radiation beam BM-BS2.

The vertical radiation beams BM1-BS1, BM2-BS1, BM3-BS1, BM4-BS1, BM5-BS1 may be applied at a same time and independently from each other. This means, that the first vertical radiation beam BM1-BS1 may be directed to the mobile station MS, which is located in the cell overlap area between the first radio cell C1 and the second radio cell C2 and for example the fourth vertical radiation beam BM4-BS1 may be directed to a further mobile station, which may be located more closer to a centre of the first radio cell C1. In a further embodiment, a mobile station may be served at a same time by one vertical radiation beam on a first frequency resource such as a first OFDM frequency subcarrier and by a further vertical radiation beam on a second frequency resource such as a second OFDM frequency subcarrier.

As already mentioned above a transmission of horizontal radiation beams by the first base station BS1 and by the second base station BS2 towards several radial directions around locations of antenna systems of the first base station BS1 and the second base station BS2 by using different azimuth angles is not shown in FIG. 1 for simplification. An azimuth angle may be defined for example as an angle between the surface normal of the radiating surface of the antenna array AA1 and a beam direction of a horizontal radiation beam.

Further base stations of the radio access network RAN and further mobile stations being connected to the radio access network RAN are not shown for simplification. The features of the methods and the network nodes BS1, BS2 and MS which are described in the following with respect to the first base station BS1 being a neighbouring base station of the second base station BS2 may be extended to further neighbouring base stations of the second base station BS2 which are not shown in FIG. 1 and are not described in the following for simplification.

The radio access network RAN further contains a first backhaul link BHL1 between the first base station BS1 and the second base station BS2 such as an X2 interface which is defined by 3GPP. The X2 interface in LTE is used for a direct information exchange between the first base station BS1 and the second base station BS2. Therefore, the first base station BS1 and the second base station BS2 establish a so-called NRT (NRT=Neighbour Relation Table). This allows to directly request parameters such as radio resource information for reference signals from each other.

Alternatively and optionally, the radio access network RAN may further contain a central database CDB for storing radio resource information of reference signals, which are transmitted via vertical radiation beams within a predefined area of the radio access network RAN or by a predefined number of base stations of the radio access network RAN. The second base station BS2 may be connected to the central database CDB by a second backhaul link BHL2. The central database CDB may be an O&M database (O&M=Operation and Maintenance), which usually contains system relevant parameters for operating a radio communication system.

The term "reference signal" may be considered synonymous to and/or referred to as a CRS (CRS=common reference symbol), CSI reference symbol (CSI=Channel State Information), common pilot, common pilot signal, common pilot symbol, beacon, beacon signal etc. which is transmitted in a multicast or broadcast to all mobile stations in a radio cell or radio sector.

Basically an operation between the first base station BS1, the second base station BS2 and the mobile station MS is as follows:

Preferably, when the mobile station MS is located at the cell border of the second radio cell C2 in the cell overlap area COA, the second base station BS2 for example transmits to the mobile station MS first radio resource information for a transmission of first reference signals via the first radiation beam BM1-BS1 and at least second radio resource information for a transmission of at least second reference signals via the second radiation beam BM2-BS1. This means the first radio resource information and the at least second radio resource information may be transmitted for a subgroup of the vertical radiation beams BM1-BS1, . . . , BM5-BS1. Alternatively, the radio resource information for a transmission of reference signals from each one of the vertical radiation beams BM1-BS1, . . . , BM5-BS1 may be transmitted from the second base station BS2 to the mobile station MS. A reception of the first radio resource information and the at least second radio resource information at the mobile station MS allows the mobile station MS to receive and detect the first reference signals and the at least second reference signals.

The first radio resource information and the at least second radio resource information may be preferably transmitted to the mobile station MS as a mapping list, which contains identifiers for the vertical radiation beams BM1-BS1, ..., BM5-BS1 and identifiers for the reference signals such as indications for time resources, frequency resources, sets of time resources and frequency resources and/or code resources. The time resources may be for example subframes of 1 ms such as applied in LTE. The frequency resources may be for example OFDM frequency subcarriers such as applied in LTE. The code resources may be for example spreading codes such as applied in UMTS. The sets of time resources and frequency resources may be for example sets of time and frequency positions of resource elements, i.e. intersections of OFDM frames and subcarriers such as applied in LTE. The first radio resource information and the at least second radio resource information may be transmitted from the first base station BS1 via the second base station BS to the mobile station MS or directly via a broadcast from the first base station BS1 to the mobile station MS.

The reference signals need to be transmitted via the vertical radiation beams BM1-BS1, ..., BM5-BS1 in such a way, that a mobile station is able to distinguish the vertical radiation beams BM1-BS1, ..., BM5-BS1. If this differentiation is done for example in a time domain, in a first time period the reference signals are transmitted via a first one of the vertical radiation beams BM1-BS1, ..., BM5-BS1, in a second time period the reference signals are transmitted via a second one of the vertical radiation beams BM1-BS1, ..., BM5-BS1 and so on.

For data transmissions from the first base station BS1 to mobile stations served by the first base station BS1 each one of the vertical radiation beams BM1-BS1, BM2-BS1, BM3-BS1, BM4-BS1, BM5-BS1 may be combined by each one of the horizontal radiation beams. While the reference signals are pre-coded in vertical direction to form a predefined number of vertical radiation beams, e.g. in time multiplex, in horizontal direction, each one of the antenna elements, which is arranged at a specific position in horizontal direction H-DIR (see FIG. 7) of the antenna array AA1 (denoted as antenna system ANT-SYS-BS1 in FIG. 7), has its own set of orthogonal reference signals. In this way, the mobile station MS is adapted to determine a best vertical radiation beam based on the signal quality for the pre-coded vertical reference signals. Furthermore, the mobile station MS is adapted to calculate a best horizontal vertical radiation beam based on the orthogonal reference signals being received per horizontal antenna element.

This means, that the mobile station MS is able to differentiate antenna elements at the different positions in the horizontal direction H-DIR. Due to the pre-coding in the vertical direction, the mobile station MS is adapted to observe or perceive the antenna elements, which are arranged at different positions in vertical direction V-DIR (see FIG. 7) of the antenna array AA1, as a single antenna element. Thereby, the mobile station MS is able to detect the different antenna elements being arranged in the horizontal direction H-DIR but observes a see-saw like jumping of a signal quality based for example on the differentiation of the vertical radiation beams in the time domain as described above.

The same principle may be preferably applied also for the second base station BS2.

The mobile station MS determines first quality information for the first radiation beam BM1-BS1 based on the received first reference signals and at least second quality information for the at least second radiation beam BM2-BS1, ..., BM5-BS1 based on the received at least second reference signals. Coverage areas of the first radiation beam BM1-BS1 and the at least second radiation beam BM2-BS1, ..., BM5-BS1 may be also interpreted as candidate cells of the mobile station MS.

Then the mobile station MS transmits at least one of the first quality information and the at least second quality information to the second base station BS2. A reception of the at least one of the first and the at least second quality information allows the second base station BS2 to determine based on the at least one of the first quality information and the at least second quality information whether a further scheduling of the mobile station MS by the second base station BS2 or a handover of the mobile station MS to one of the vertical radiation beams BM1-BS1, ..., BM5-BS1 of the first base station BS1 is more suitable. In one embodiment, the mobile station MS may transmit only quality information for a best vertical radiation beam BM1-BS1, ..., BM5-BS1 to the second base station BS2.

When for example the second base station BS2 decides for the further scheduling of the mobile station MS, the second base station BS2 may schedule the mobile station MS for uplink data and/or downlink data based on the at least one of the first quality information and the at least second quality information in at least one time slot, when a usage of at least one of the first vertical radiation beam BM1-BS1 and of the at least one second vertical radiation beam BM2-BS1, ..., BM5-BS1 by the first base station BS1 fulfills a predefined criterion such as that the at least one of the first vertical radiation beam BM1-BS1 and of the at least one second vertical radiation beam BM2-BS1, ..., BM5-BS1 will not used by the first base station BS1 during the at least one time slot.

When alternatively the second base station BS2 decides for a handover of the mobile station MS to the first base station BS1, the second base station BS2 determines based on the at least one of the first quality information and the at least second quality information one of the first vertical radiation beam BM1-BS1 and of the at least one second vertical radiation beam BM2-BS1, ..., BM5-BS1 as an initial serving radiation beam to be applied at the first base station BS1 for serving the mobile station MS after the handover from the second base station BS2 to the first base station BS1. In such a case, the second base station BS2 transmits beam information of the selected initial serving radiation beam to the first base station BS1. When receiving the beam information, the first base station BS1 applies the selected initial serving radiation beam for serving the mobile station MS for scheduling the mobile station MS.

Figure 2:
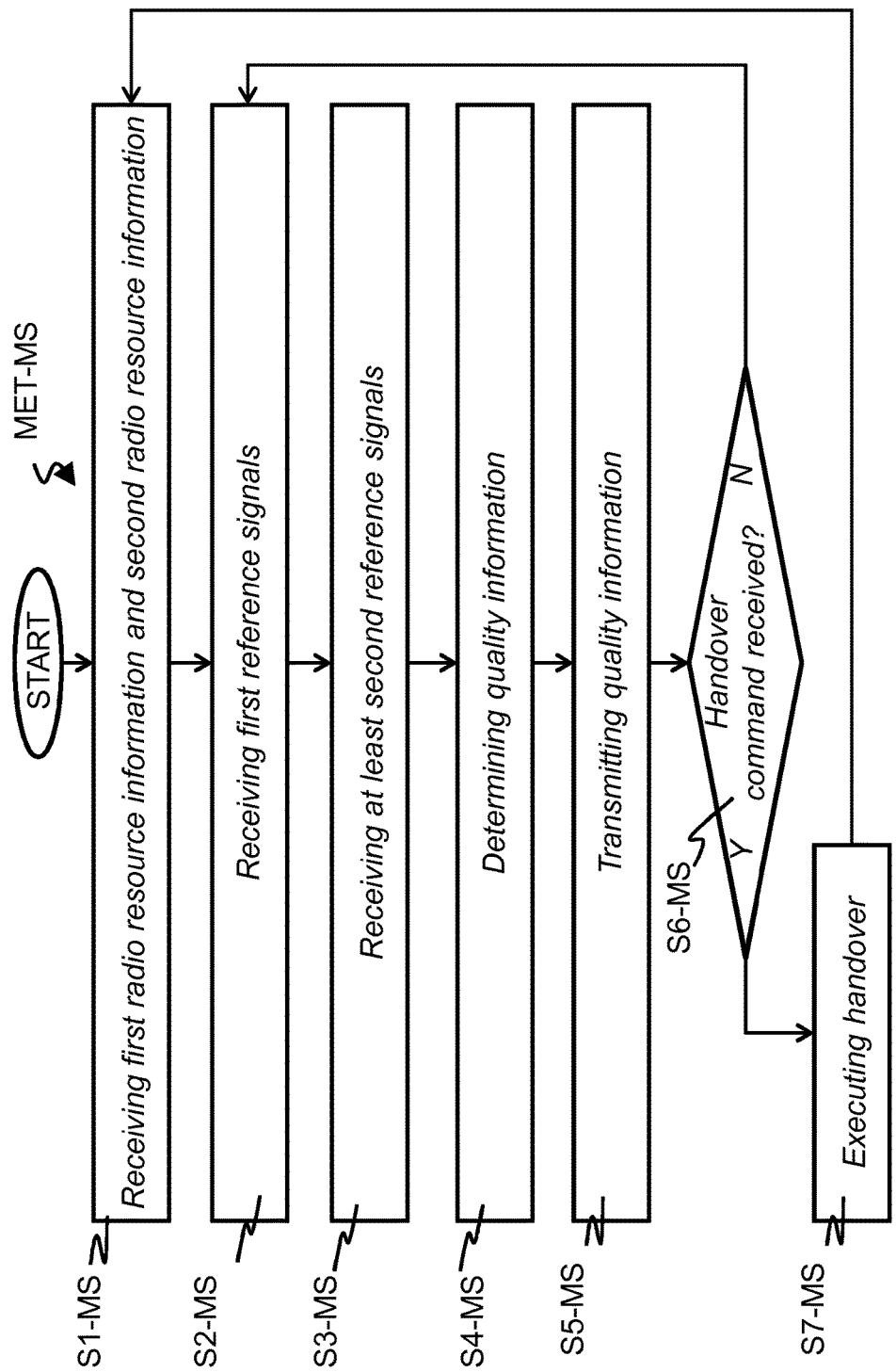
FIG. 2 shows schematically a flow diagram of a method for a mobile station for radiation beam selection in a radio communication system.
Figure 3:
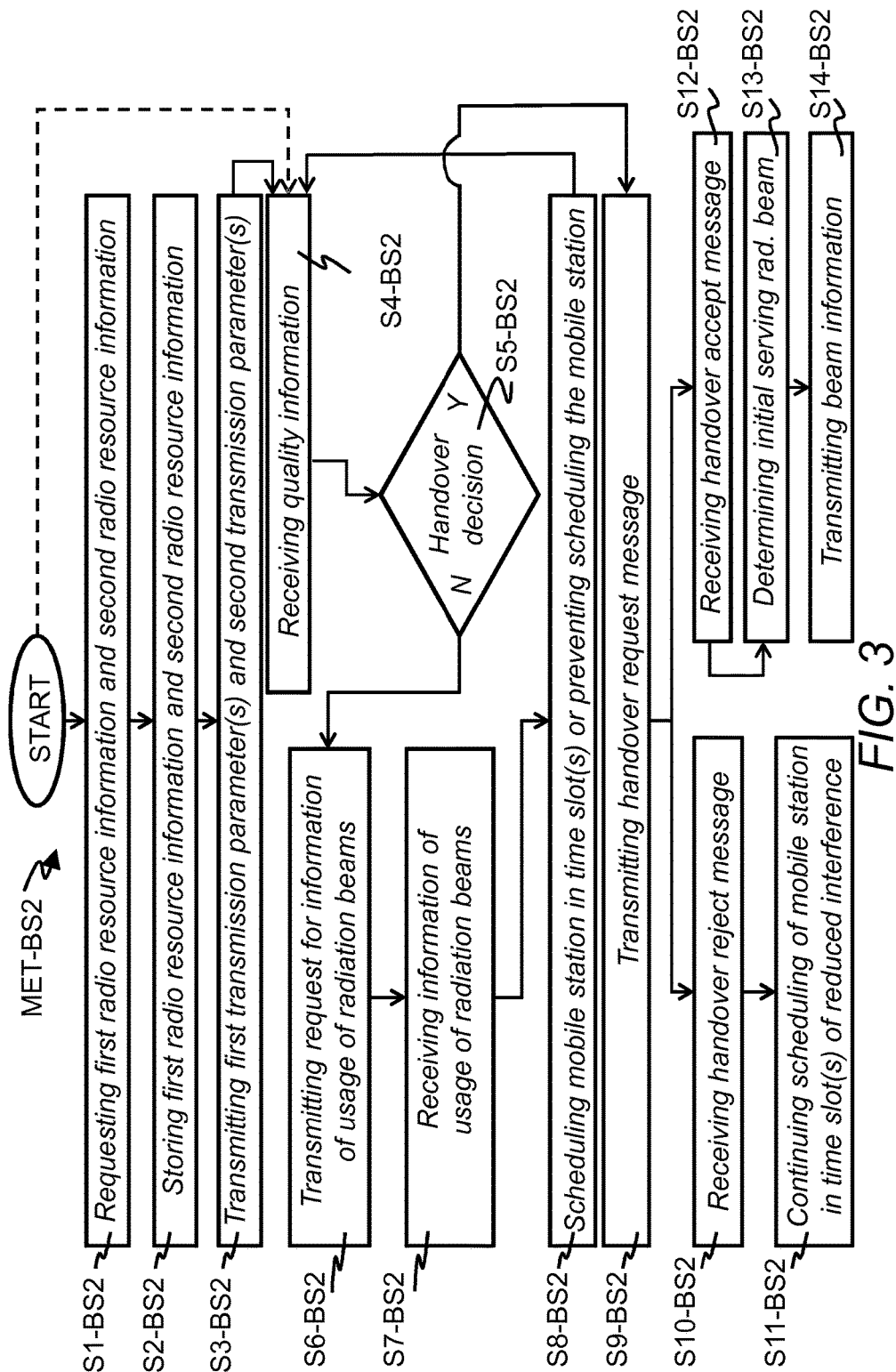
FIG. 3 shows schematically a flow diagram of a method for a second base station for radiation beam selection in a radio communication system.
Figure 4:
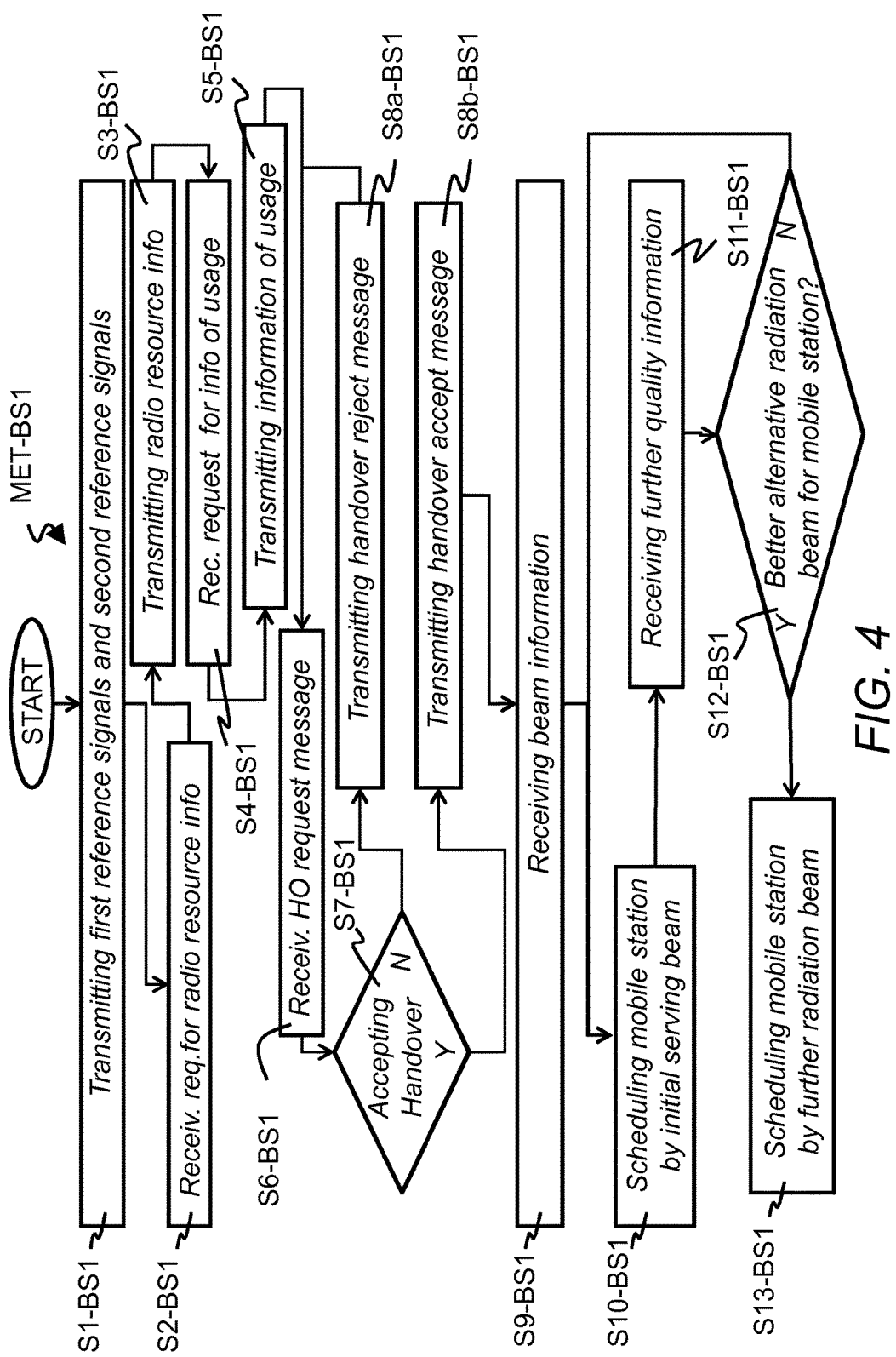
FIG. 4 shows schematically a flow diagram of a method for a first base station for radiation beam selection in a radio communication system.

More details about the methods being applied by the mobile station MS, the second base station BS2 and the first base station BS1 are described with respect to following FIGS. 2, 3 and 4.

A technical description is given above with respect to FIG. 1 and below with respect to FIGS. 2 to 7 for a preferred embodiment of vertical radiation beams. In an alternative embodiment, the vertical radiation beams may be replaced by horizontal radiation beams or by a mixture of vertical radiation beams and horizontal radiation beams.

FIG. 2 shows schematically a flow diagram of a method MET-MS for the mobile station MS for executing mobile station related process steps for a treatment or administration of the vertical radiation beams BM1-BS1, . . . , BM5-BS1 in the radio access network RAN.

In a first step S1-MS, the mobile station MS receives the first radio resource information for the first reference signals and the at least second radio resource information for the second reference signals and preferably for further reference signals being transmitted via the vertical radiation beams BM3-BS1, BM4-BS1, BM5-BS1. In a first alternative, the mobile station MS may receive the first radio resource information and the at least second radio resource information from the second base station BS2 for example by an RRC message (RRC=Radio Resource Control) such as applied in 3GPP radio communication systems. In a second alternative, the mobile station MS may receive the first radio resource information and the at least second radio resource information directly from the first base station BS1 for example by a broadcast message on a broadcast channel.

In a first embodiment, when a same type of reference signals are periodically switched between the first vertical radiation beam BM1-BS1 and the at least one second vertical radiation beam BM2-BS1, . . . , BM5-BS1, the first vertical radiation beam BM1-BS1 and the at least one second vertical radiation beam BM2-BS1, . . . , BM5-BS1 are periodically pre-coded with one of a group of vertical pre-codings, which are applied for the first vertical radiation beam BM1-BS1 and for the at least one second vertical radiation beam BM2-BS1, . . . , BM5-BS1. In such a case, the first radio resource information comprises a first indication for first time resources or first timing information such as information of a first periodic time slot for a preferably periodic transmission of the first reference signals. In a same way, the at least second radio resource information comprises at least one second indication for second time resources or second timing information such as information of a second periodic time slot for a preferably periodic transmission of the at least second reference signals.

In a second embodiment, when a same type of reference signals are periodically switched between the first vertical radiation beam BM1-BS1 and the at least one second vertical radiation beam BM2-BS1, . . . , BM5-BS1, the first radio resource information contains first indications for example for positions of the first reference signals within a first grid of time resources and frequency resources. In a same way, the at least second radio resource information contains at least second indications for example for positions of the at least second reference signals within at least one second grid of time resources and frequency resources. In LTE for example, the reference signals are located in each sub-frame and in each first and sixth OFDM symbol at subcarrier positions 6, 12, 18, . . . and in each third and ninth OFDM symbol at subcarrier positions 3, 9, 15, . . . . In a preferred embodiment, reference signals of a first sub-frame are used for the first vertical radiation beam BM1-BS1, reference signals of a second sub-frame are used for a second one of the at least one second vertical radiation beam BM2-BS1, . . . , BM5-BS1 and so on. In an alternative embodiment, frequency positions of the reference signals may be distributed across the first vertical radiation beam BM1-BS1 and the at least one second vertical radiation beam BM2-BS1, . . . , BM5-BS1.

In a third embodiment each one of the vertical radiation beams BM1-BS1, . . . , BM5-BS1 may have a different code resource such as a different spreading code. Thereby, several or all of the vertical radiation beams BM1-BS1, . . . , BM5-BS1 may be measured simultaneously by the mobile station MS. In this case, the first radio resource information contains for example a first indication for a first spreading code being applied for a transmission of the first reference signals. In a same way, the at least second radio resource information contains for example at least one second indication for at least one second spreading code being applied for a transmission of the at least second reference signals.

With respect to the first, second or thirds embodiments given above, the first radio resource information may contain a further indication for the first radiation beam BM1-BS1 and the at least second radio resource information may contain a further indication for the second radiation beam BM2-BS1 or for the second radiation beam BM2-BS1 and for at least one of the further radiation beams BM3-BS1, BM4-BS1, BM5-BS1.

The mobile station MS uses the first radio resource information and the at least second radio resource information to synchronize in time a receiver apparatus of the mobile station MS to the various time multiplexed reference signals with respect to the first embodiment or to synchronize in frequency the receiver apparatus of the mobile station MS to the various frequency multiplexed reference signals with respect to the second embodiment or uses the first radio resource information and the at least second radio resource information to adapt a decoding of the receiver apparatus to the various spreading codes of the reference signals.

By a further step S2-MS, the mobile station MS receives the first reference signals and with at least one further step S3-MS, the mobile station MS receives the at least one second reference signal.

In step S4-MS the mobile station MS may determine the first quality information for the first vertical radiation beam BM1-BS1 based on an analysis of the received first reference signals and the at least second quality information for one of the at least second vertical radiation beam BM2-BS1, . . . , BM5-BS1 based on received corresponding reference signals or may determine quality information for each of the vertical radiation beams BM1-BS1, . . . , BM5-BS1 for which reference signals could be received with sufficient receive power. The first quality information and the at least second quality information may be for example received signal levels such as signal strength values, SINR values (SINR=Signal to Interference-plus-Noise Ratio) or a supported Modulation and Coding Scheme (MCS) of the received first and at least second reference signals. A specific signal strength, SINR, or MCS value for a certain vertical radiation beam corresponds to a specific interference level of the vertical radiation beams BM1-BS1, . . . , BM5-BS1 at a location of the mobile station MS. The higher the signal strength, SINR or the MCS value, the higher is the interference level.

By a further step S5-MS, the mobile station MS transmits at least one of the first quality information and the at least second quality information and may be also quality information for the further vertical radiation beams BM3-BS1, . . . , BM5-BS1 to the second base station BS2. Therefore, the mobile station MS may use for example a handover request message such as a so-called A3 message as applied by the 3GPP 36.331 radio communication standard. The mobile station MS may transmit quality information in various variants. Preferably, the mobile station MS transmits only quality information of one of the first vertical radiation beam BM1-BS1 and of the at least second vertical radiation beam BM2-BS1, . . . , BM5-BS1 which provides a highest quality such as a largest received signal level. For giving the second base station BS2 a larger leeway in decision-making, the mobile station MS may alternatively transmit quality information for a subgroup with at least two of all received vertical radiation beams BM1-BS1, . . . , BM5-BS1 or may transmit quality information for all of the received vertical radiation beams BM1-BS1, . . . , BM5-BS1.

In step S6-MS the mobile station MS verifies whether a handover command message may have been received at the mobile station MS from the second base station BS2. When no such handover command message has been received, the method MET-MS may be continued by the step S2-MS. When else the handover command message has been received, the method MET-MS may be continued by step S7-MS. The handover command message may contain for example information, that the mobile station MS may detach from the second radio cell C2 and may attach to an indicated one of the vertical radiation beams BM1-BS1, . . . , BM5-BS1 of the first radio cell C1.

With a further step S7-MS, the mobile station MS executes a handover from the second radio cell C2 to the indicated one of the vertical radiation beams BM1-BS1, . . . , BM5-BS1 of the first radio cell C1.

A further step after the step S7-MS may be again the step S1-MS. For the further method now the roles of the first base station BS1 and the second base station BS2 are interchanged.

FIG. 3 shows schematically a flow diagram of a method MET-BS2 for the second base station BS2 for executing base station related process steps of a serving base station for a treatment or administration of the vertical radiation beams BM1-BS1, . . . , BM5-BS1 in the radio access network RAN.

According to a first alternative, a knowledge of the first radio resource information and the at least second radio resource information at the second base station BS2 may be pre-configured and stored in a local database of the second base station BS2 for a transmission of reference signals via vertical radiation beams of all neighboring base stations of the second base station BS2 when the second base station is installed. In such a case no request messages needs to be exchanged between the second base station BS2 and the neighboring base stations such as the first base station BS1 as long as a configuration for transmitting the vertical radiation beams at one of the neighboring base stations is not changed. When no such pre-configuration may be applied in a first step S1-BS2, the second base station BS2 may transmit a message to the first base station BS1 for requesting the first radio resource information of the first reference signals and the at least second radio resource information of the second reference signals and may be also further reference signals of the further vertical radiation beams BM3-BS1, . . . , BM5-BS1.

Alternatively, the second base station BS2 may transmit the message to the central database CDB for requesting the first radio resource information of the first reference signals and the at least second radio resource information of the at least second reference signals being transmitted via the vertical radiation beams BM1-BS1, . . . , BM5-BS1 of the first base station BS1.

When receiving the first radio resource information and the at least second radio resource information from the first base station BS1 or from the central database CDB, the second base station BS2 may store by a further step S2-BS2 the first radio resource information and the at least second radio resource information in the local database of the second base station BS2.

In a further step S3-BS2, when a mobile station such as the mobile station MS arrives at a border of the second radio cell C2 and at the cell overlap area COA, the second base station BS2 may query the first radio resource information of the first reference signals and the at least second radio resource information of the at least second reference signals being transmitted via the vertical radiation beams BM1-BS1, . . . , BM5-BS1 from its own local database and transmits the first radio resource information and the at least second radio resource information to the mobile station MS.

In a next step S4-BS2, the second base station BS2 receives the at least one of the first quality information and/or the at least second quality information and may be also quality information for the further vertical radiation beams BM3-BS1, . . . , BM5-BS1 from the mobile station MS. The step S4-BS2 may be a first step, when the first radio resource information and the at least second radio resource information are directly transmitted from the first base station BS1 via the broadcast message to the mobile station MS. The dashed arrow shows an alternative embodiment, when the method MET-BS2 may not contain the steps S1-BS2, S2-BS2 and S3-BS2.

By a further step S5-BS2, the second base station BS2 determines based on the at least one of the first quality information and the at least second quality information, whether a further scheduling of the mobile station MS by the second base station BS2 or a handover or cell re-association of the mobile station MS to one of the vertical radiation beams BM1-BS1, . . . , BM5-BS1 of the first base station BS1 is more suitable. The second base station BS2 decides for the handover or the cell re-association, when for example one of the vertical radiation beams BM1-BS1 . . . BM2-BS1 has a higher receive signal level, a higher SINR, or a higher supported MCS at the mobile station MS compared to the currently applied vertical radiation beam BM-BS2 of the second base station BS2 for scheduling the mobile station MS.

In such a case, step S9-BS2 is a next step. Else the method MET-BS2 is continued by a further step S6-BS2.

By the step S6-BS2, the second base station BS2 may transmit a request to the first base station BS1 for getting information regarding a usage of the first radiation beam BM1-BS1 and of the at least one second radiation beam BM2-BS1, . . . , BM5-BS1 by the first base station BS1 for transmitting downlink data to mobile stations being served by the first base station BS1 and preferably further regarding a transmission of uplink data by the mobile stations to the first base station BS1.

In a further step S7-BS2, the second base station BS2 may receive the information regarding the usage of the first radiation beam BM1-BS1 and of the at least one second radiation beam BM2-BS1, . . . , BM5-BS1 and preferably regarding a transmission of uplink data by the mobile stations to the first base station BS1 from the first base station BS1. The information may indicate for example one or several of the vertical radiation beams BM1-BS1, . . . , BM5-BS1 and may further indicate one or several time slots or a time frame containing several time slots for a predefined time in the future such as e.g. 10 ms or 20 ms when the first base station BS1 will not use the one or several of the vertical radiation beams BM1-BS1, . . . , BM5-BS1 for scheduling mobile stations which are served by the first base station BS1. The information may preferably further indicate for the one or several time slots, for the time frame containing the several time slots of for one or several further time slots in each case within a predefined time in the future such as e.g. 10 ms or 20 ms when the mobile stations served by the first base station BS1 will transmit uplink data to the first base station BS1.

The information may be repeatedly sent from the first base station BS1 for a predefined time after receiving the request from the second base station BS2.

In a next step S8-BS2, the second base station BS2 may schedule the mobile station MS in one of the time slots or time frames as indicated by the first base station BS1 because during such time slots or time frames a radio transmission between the second base station BS2 and the mobile station MS is less impacted by interference which is generated by data transmission and by transmission of dedicated pilot (so-called demodulation reference symbols DRS) via the vertical radiation beams BM1-BS1, . . . , BM5-BS1 of the first base station BS1. A further step after the step S8-BS2 may be the step S4-BS2.

Alternatively, the second base station BS2 may prevent a scheduling of the mobile station MS for uplink data in the at least one time slot or the at least one further time slot, when during the at least one time slot or the at least one further time slot uplink data are transmitted to the first base station BS1 from at least one of the mobile stations be served by the first base station BS1.

In step S9-BS2, the second base station BS2 may transmit a handover request message to the first base station BS1 for requesting a handover from the second base station BS2 to the first base station BS1 as a so-called target base station for the mobile station MS. A next step after the step S9-BS2 may be step S10-BS2 or step S12-BS2.

By the step S10-BS2, the second base station BS2 may receive from the first base station BS1 a handover reject message that the handover is rejected by the first base station BS1. In such a case, the second base station BS2 may continue by a further step S11-BS2 scheduling the mobile station MS in one of the time slots or time frames as indicated by the first base station BS1.

By the step S12-BS2, the second base station BS2 may else receive from the first base station BS1 a handover accept message that the handover is accepted by the first base station BS1. In such a case, the second base station BS2 determines in a further step S13-BS2 based on the quality information received from the mobile station MS one of the vertical radiation beams BM1-BS1, . . . , BM5-BS1 as an initial serving radiation beam for serving the mobile station MS at the first base station BS1 after the handover from the second base station BS2 to the first base station BS1.

In a next step S14-BS2, the second base station BS2 transmits beam information of the selected initial serving radiation beam to the first base station BS1. The beam information contains at least one identifier for the selected initial serving radiation beam and may preferably also contain quality information of the selected initial serving radiation beam. The quality information may be for example quality information as being received at the second base station BS2 from the mobile station MS before the handover is executed. This means, that the quality information may be for example a CQI value or a receive signal level preferably as lastly measured and reported by the mobile station MS to the second base station BS2 before the handover of the mobile station MS from the second base station BS2 to the first base station BS1 is executed.

FIG. 4 shows schematically a flow diagram of a method MET-BS1 for the first base station BS1 for executing base station related process steps of a neighboring base station for a treatment or administration of vertical radiation beams BM1-BS1, . . . , BM5-BS1 in the radio access network RAN.

In a first step S1-BS1, the first base station BS1 transmits the first reference signals via the first vertical radiation beam BM1-BS1, the second reference signals via the second vertical radiation beam BM2-BS1, and corresponding reference signals via the further vertical radiation beams BM3-BS1, . . . , BM5-BS1.

By a further optional step S2-BS1, the first base station BS1 may receive the message from the second base station BS2 for requesting the first radio resource information and the at least second radio resource information.

In a next optional step S3-BS1, the first base station BS1 transmits the first radio resource information and the at least second radio resource information to the second base station BS2.

According to an alternative embodiment with respect to the steps S2-BS1 and S3-BS1, the first base station BS1 may transmit by the broadcast message via the broadcast channel the first radio resource information and the at least second radio resource information.

In a further step S4-BS1, the first base station BS1 receives the request from the second base station BS2 for providing information regarding the usage of the first radiation beam BM1-BS1 and of the at least one second radiation beam BM2-BS1, . . . , BM5-BS1 by the first base station BS1.

In a next step S5-BS1, the first base station BS1 transmits the information regarding the usage of the first radiation beam BM1-BS1 and of the at least one second radiation beam BM2-BS1, . . . , BM5-BS1 to the second base station BS2.

In a further step S6-BS1, the first base station BS1 receives the handover request message from the second base station BS2.

By a next step S7-BS1, the first base station BS1 verifies, whether the handover of the mobile station MS from the second base station BS2 to the first base station BS1 shall be accepted or rejected. A decision making at the first base station BS1 may depend for example on a current load situation at the first base station BS1. When the handover is rejected by the first base station BS1, step S8a-BS1 may be a next step. Else when the handover is rejected by the first base station BS1, step S8b-BS1 may be a further step.

By the step S8a-BS1, the first base station BS1 transmits the handover reject message to the second base station BS2. A next step after the step S8a-BS1 may be again the step S6-BS1.

Using the step S8b-BS1, the first base station BS1 transmits the handover accept message to the second base station BS2.

In a further step S9-BS1, the first base station BS1 receives from the second base station BS2 the beam information of the initial serving radiation beam as selected by the second base station BS2. In current 3GPP standards a target base station has no information and gets no information about a channel quality and a PMI (PMI=Precoding Matrix Indication) directly after a handover and before a first CQI measurement is received from a mobile station which has executed the handover. The beam information allows the first base station BS1 to automatically select a suitable vertical radiation beam at a beginning of a time period for serving the mobile station MS.

In a next step S10-BS1, the first base station BS1 schedules the mobile station MS directly after the handover by the initial serving radiation beam as selected by the second base station BS2.

By further step S11-BS1, the first base station BS1 may receive from the mobile station MS further quality information of at least one of the vertical radiation beams BM1-BS1, . . . , BM5-BS1 and the vertical radiation beam BM-BS2 in a similar way as the step S4-BS2 which is executed by the second base station BS2.

In step S12-BS1, the first base station BS1 verifies based on the received further quality information whether a better alternative as the initial serving radiation beam for serving the mobile station MS exists. For such verification the first base station BS1 may compare for example received signals levels. When no better alternative exists, a next step after the step S12-BS1 may be again the step S10-BS1. When else another vertical radiation beam with for example a larger received signal level than the initial serving radiation beam exists, a next step after the step S12-BS1 may be step S13-BS1.

By the step S12-BS1, the first base station BS1 may perform a beam switching for the mobile station MS and may schedule the mobile station MS by the further vertical radiation beam.

Figure 5:
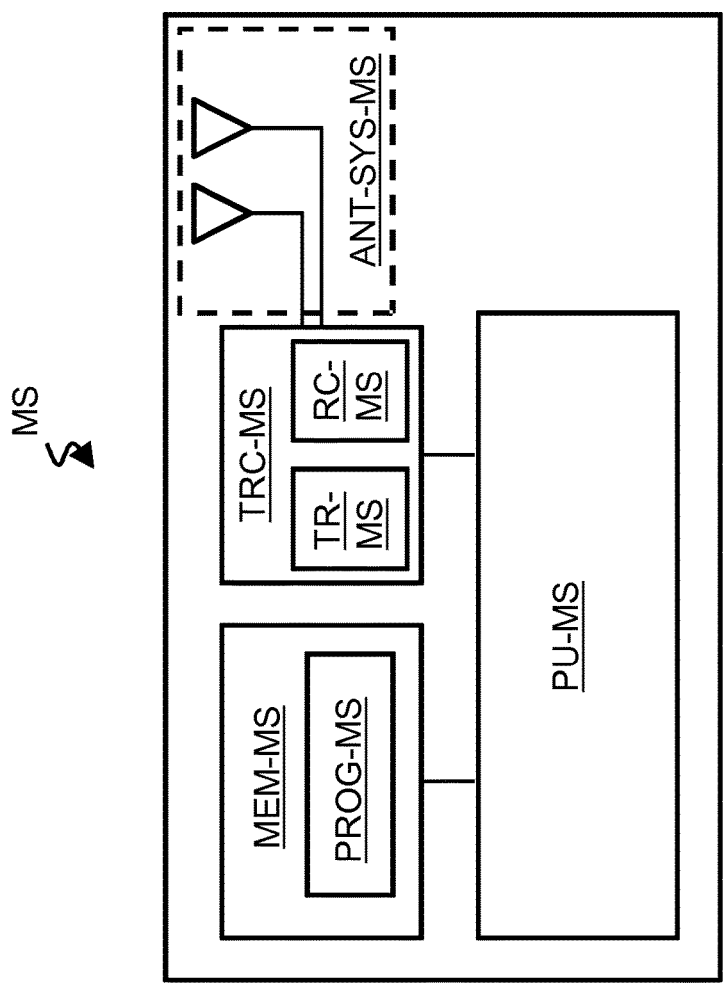
FIG. 5 shows schematically a block diagram of a mobile station being adapted for radiation beam selection in a radio communication system.

FIG. 5 shows schematically an exemplarily block diagram of the mobile station MS. The mobile station MS contains an antenna system ANT-SYS-MS and a transceiver MS-TRC for transmitting uplink radio frequency signals towards the first base station BS1 or the second base station BS2 and for receiving downlink radio frequency signals from the first base station BS1 or the second base station BS2 via the antenna system ANT-SYS-MS. The antenna system ANT-SYS-MS exemplarily contains two antenna elements but may alternatively contain only a single antenna element or more than two antenna elements.

The transceiver TRC-MS contains a transmitter part TR-MS and a receiver part RC-MS. Alternatively, the mobile station MS may contain instead of the transceiver TRC-MS a separate transmitter and a separate receiver.

The transceiver TRC-MS and the antenna system ANT-SYS-MS are adapted for receiving from the second base station BS2 the first radio resource information and the at least second radio resource information, for receiving the first reference signals based on the first radio resource information and for receiving the at least second reference signals based on the at least second radio resource information. The transceiver TRC-MS and the antenna system ANT-SYS-MS are further adapted for transmitting the at least one of the first quality information and of the at least second quality information to the second base station BS2.

The mobile station MS further contains a memory MEM-MS for storing a computer program PROG-MS which contains commands for executing the method MET-MS. The mobile station MS further contain a processing unit PU-MS for executing the computer program PROG-MS. The processing unit PU-MS and the computer program PROG-MS are for example adapted to determine the first quality information for the first radiation beam BM1-BS1 based on the received first reference signals and the at least second quality information for the at least one second radiation beam BM2-BS1, . . . , BM5-BS1 based on the received at least second reference signals.

Figure 6:
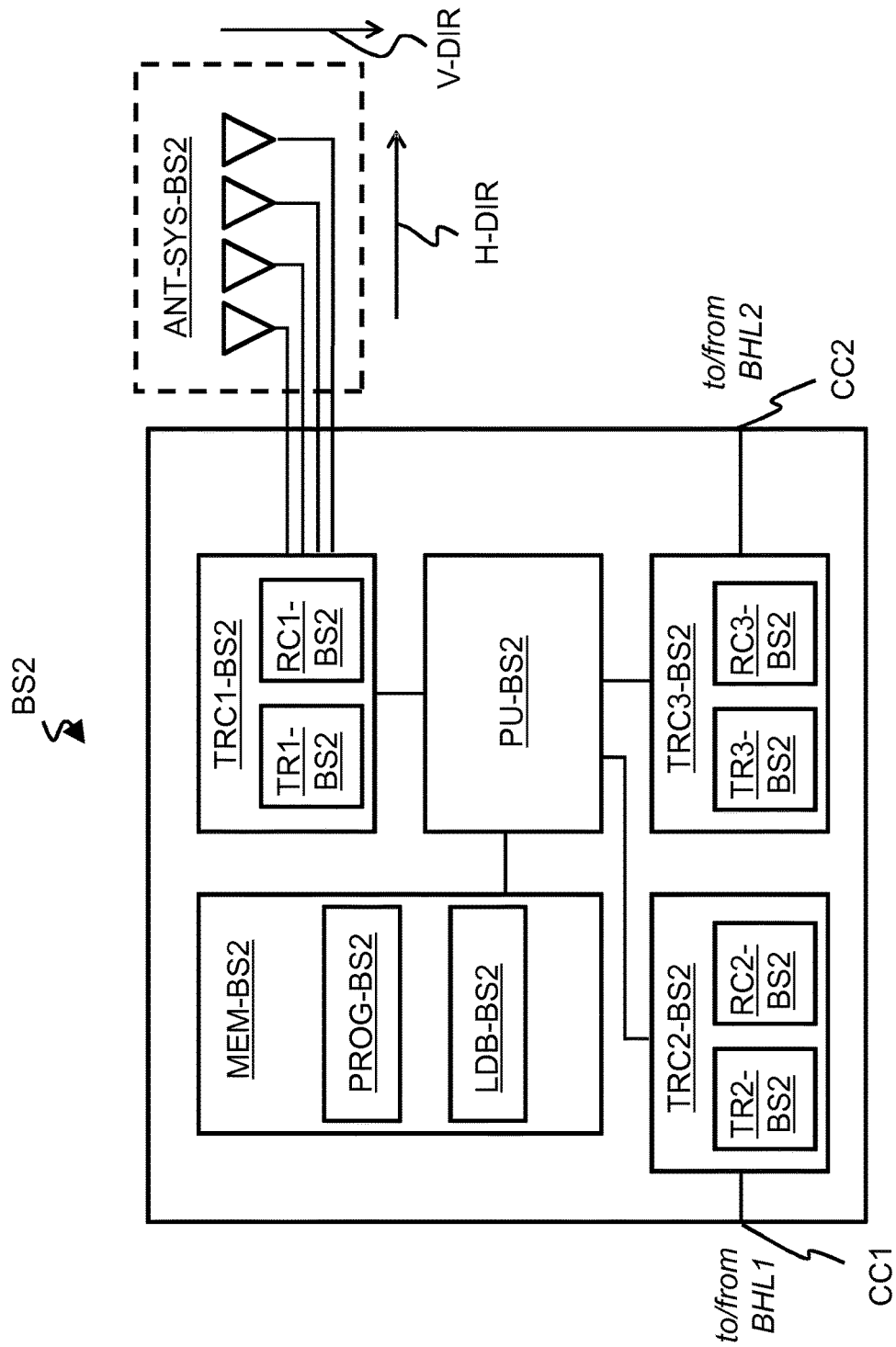
FIG. 6 shows schematically a block diagram of a second base station being adapted for radiation beam selection in a radio communication system.

FIG. 6 shows schematically an exemplarily block diagram of the second base station BS2. The second base station BS2 contains an antenna system ANT-SYS-BS2 and a first transceiver TRC1-BS2 for transmitting downlink radio frequency signals towards the mobile station MS and for receiving uplink radio frequency signals from the mobile station MS via the antenna system ANT-SYS-BS2. The first transceiver TRC1-BS2 contains a transmitter part TR1-BS2 and a receiver part RC1-BS2. Alternatively, the second base station BS2 may contain instead of the transceiver TRC1-BS2 a separate transmitter and a separate receiver.

The antenna system ANT-SYS-BS2 may be for example a linear antenna array which contains exemplarily 4 antenna elements in a 1 (vertical)×4 (horizontal) arrangement. The linear antenna array in horizontal direction H-DIR with respect to the Earth's surface allows transmitting several horizontal radiation beams towards different radial directions from a centre of the second radio cell C2 towards the border of the second radio cell C2. Alternatively, the antenna system ANT-SYS-BS1 may contain less than 4 antenna elements such as 2 antenna elements in a 1×2 arrangement or more than 4 antenna elements such as 8 antenna elements in a 1×8 arrangement.

The first transceiver TRC1-BS2 and the antenna system ANT-SYS-BS2 are adapted for transmitting to the mobile station MS the first radio resource information for the transmission of the first reference signals via the first radiation beam BM1-BS1 being directed by the first base station BS1 towards the first direction and the at least second radio resource information for the transmission of the at least second reference signals via the at least one second radiation beam BM2-BS1, . . . , BM5-BS1 directed by the first base station BS1 towards the at least one second direction. The first transceiver TRC1-BS2 and the antenna system ANT-SYS-BS2 are further adapted for receiving from the mobile station MS2 the at least one of first quality information of the first radiation beam BM1-BS1 and the at least second quality information of the at least one second radiation beam BM2-BS1, . . . , BM5-BS1.

The second base station BS2 further contains a first cable connection CC1 and a second transceiver TRC2-BS2 which is connected to the first cable connection CC1. The second transceiver TRC2-BS2 contains a transmitter part TR2-BS2 and a receiver part RC2-BS2. Alternatively, the second base station BS2 may contain instead of the second transceiver TRC2-BS2 a further separate transmitter and a further separate receiver. The second transceiver TRC2-BS2 may be adapted to communicate with a corresponding transceiver of the first base station BS1.

According an alternative embodiment, the first backhaul connection BHL1 may be realized by a wireless connection between the first base station BS1 and the second base station BS2.

The second base station BS2 may even further contain a second cable connection CC2 and a third transceiver TRC3-BS2 which is connected to the second cable connection CC2. The third transceiver TRC3-BS2 contains a transmitter part TR3-BS2 and a receiver part RC3-BS2. Alternatively, the second base station BS2 may contain instead of the third transceiver TRC3-BS2 an even further separate transmitter and an even further separate receiver. The third transceiver TRC3-BS1 may be adapted to communicate with the central database CDB.

The second base station BS2 even further contains a memory MEM-BS2 for storing a computer program PROG-BS2 which contains commands for executing the method MET-BS2. The memory MEM-BS2 may be further adapted for storing a local database LDB-BS2. The local database LDB-BS2 may store the first radio resource information and the at least second radio resource information. The local database LDB-BS2 may further store information of time slots or time frames of the vertical radiation beams of the base stations in the neighborhood of the second base station BS2, when these vertical radiation beams are not used for scheduling mobile stations.

The second base station BS2 further contains a processing unit PU-BS2 for executing the computer program PROG-BS2. The processing unit PU-BS2 and the computer program PROG-BS2 are adapted for example to determine based on the at least one of the first quality information and the at least second quality information whether a further scheduling of the mobile station MS by the second base station BS2 or a handover for the mobile station MS towards the first base station BS1 is more suitable.

Figure 7:
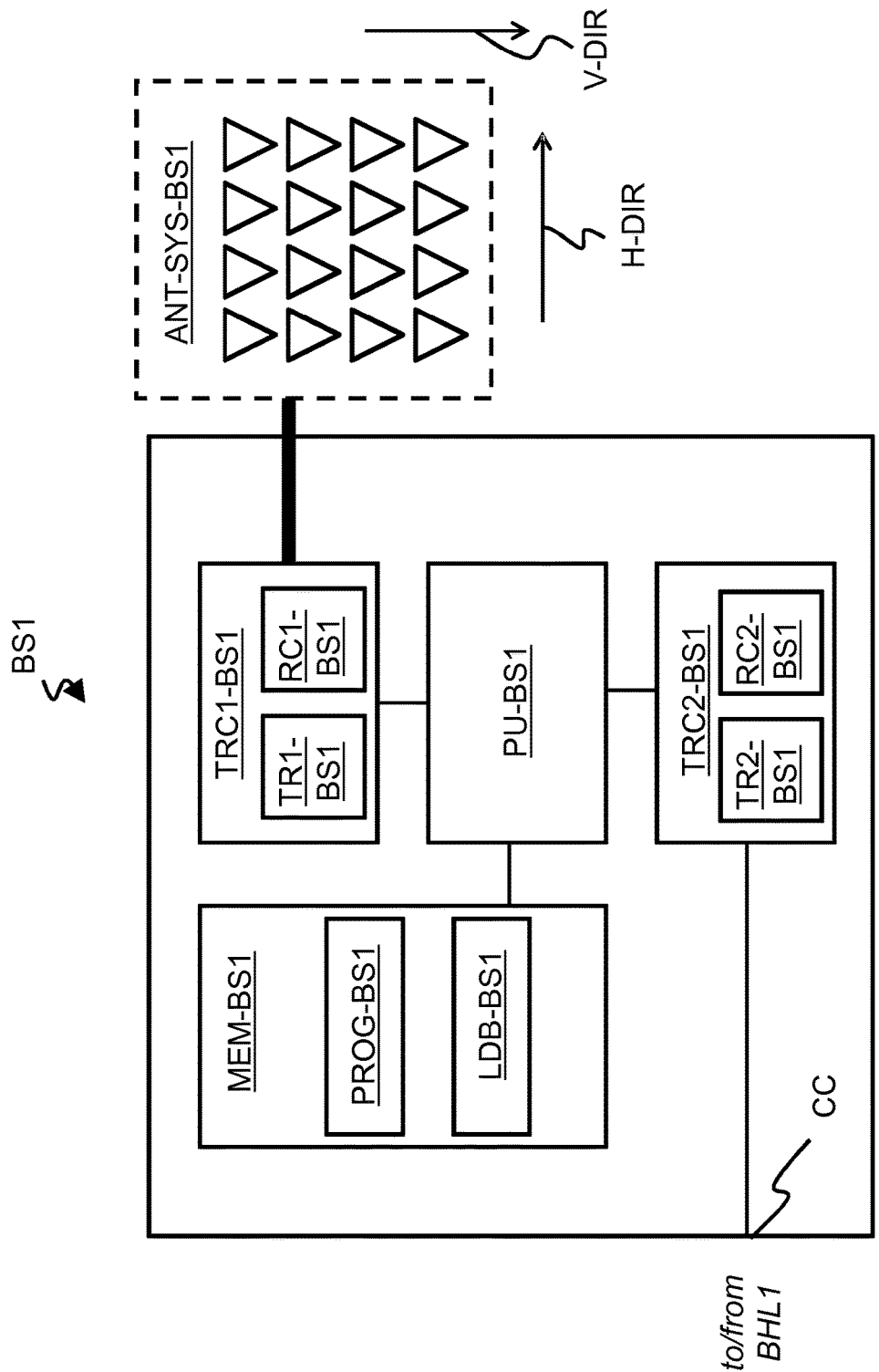
FIG. 7 shows schematically a block diagram of a first base station being adapted for radiation beam selection in a radio communication system.

FIG. 7 shows schematically an exemplarily block diagram of the first base station BS1. The first base station BS1 contains an antenna system ANT-SYS-BS1 and a first transceiver TRC1-BS1 for transmitting downlink radio frequency signals towards the mobile station MS and for receiving uplink radio frequency signals from the mobile station MS via the antenna system ANT-SYS-BS1. The first transceiver TRC1-BS1 contains a transmitter part TR1-BS1 and a receiver part RC1-BS1. Alternatively, the first base station BS1 may contain instead of the first transceiver TRC1-BS1 a separate transmitter and a separate receiver.

The antenna system ANT-SYS-BS1 may be for example a rectangular planar antenna array which contains exemplarily 16 antenna elements in a 4 (vertical)×4 (horizontal) arrangement. A first antenna stack in the vertical direction V-DIR with respect to the Earth's surface allows transmitting the vertical radiation beams BM1-BS1, . . . , BM5-BS1 with different elevation angles ELA1, ELA2 (not all elevation angles shown in FIG. 1 for simplification). A second antenna stack in the horizontal direction H-DIR with respect to the Earth's surface allows transmitting several horizontal radiation beams towards different radial directions from a centre of the first radio cell C1 towards a border of the first radio cell C1. Alternatively, the antenna system ANT-SYS-BS1 may contain less than 16 antenna elements such as 8 antenna elements in a 2×4 arrangement or more than 16 antenna elements such as 32 antenna elements in a 4×8 arrangement.

The first transceiver TRC1-BS1 and the antenna system ANT-SYS-BS1 are adapted for transmitting the first reference signals via the first radiation beam BM1-BS1 directed towards the first direction and the at least second reference signals via the at least one second radiation beam BM2-BS1, . . . , BM5-BS1 directed towards the at least one second direction. The first transceiver TRC1-BS1 and the antenna system ANT-SYS-BS1 are further adapted for receiving for the handover of the mobile station MS from the second base station BS2 to the first base station BS1 quality information of one of the first radiation beam BM1-BS1 and of the at least one second radiation beam BM2-BS1, . . . , BM5-BS1. The received quality information may be regarded as an indication that the corresponding vertical radiation beam shall be applied by the first base station BS1 as an initial serving radiation beam for serving the mobile station MS.

The first base station BS1 further contains for example a cable connection CC and a second transceiver TRC2-BS1 which is connected to the cable connection CC. The second transceiver TRC2-BS1 contains a transmitter part TR2-BS1 and a receiver part RC2-BS1. Alternatively, the first base station BS1 may contain instead of the second transceiver TRC2-BS1 a further separate transmitter and a further separate receiver. The second transceiver TRC2-BS1 may be adapted to communicate with the second transceiver TRC2-BS2 of the second base station BS2.

According an alternative embodiment, the first backhaul connection BHL1 may be realized by a wireless connection between the first base station BS1 and the second base station BS2.

The first base station BS1 even further contains a memory MEM-BS1 for storing a computer program PROG-BS1 which contains commands for executing the method MET-BS1. The memory MEM-BS1 may be further adapted for storing a local database LDB-BS1. The local database LDB-BS1 may store the first radio resource information and the at least second radio resource information. The local database LDB-BS1 may further store information of time slots or time frames of the vertical radiation beams of the base stations in the neighborhood of the first base station BS1, when these vertical radiation beams are not used for scheduling mobile stations such as the mobile station MS.

The first base station BS1 further contains a processing unit PU-BS1 for executing the computer program PROG-BS1. The processing unit PU-BS1, the computer program PROG-BS1 and the first transceiver TRC1-BS1 are for example adapted to verify, whether a handover request from the second base station BS2 may be accepted or rejected, to interpret a reception of the quality information of the initial serving radiation beam as a recommendation or a command from the second base station BS2 to schedule the mobile station MS by the initial serving radiation beam and to verify, whether an alternative vertical radiation beam may be applied for the mobile station MS after receiving further quality information of the vertical radiation beams directly from the mobile station MS.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for performing a certain function" shall be understood as functional blocks comprising circuitry that is adapted for performing the certain function, respectively. Hence, a "means for something" may as well be understood as a "means being adapted or suited for something". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, network processor, ASIC, FPGA, read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that the methods MET-MS, MET-BS1, MET-BS2 disclosed in the specification or in the claims may be implemented by a device having means for performing each of the respective steps of these methods. Preferably, a computer program product may contain computer-executable instructions for performing the methods MET-MS, MET-BS1, MET-BS2, when the computer program product is executed on a programmable hardware device such as a DSP, an ASIC or an FPGA. Preferably, a digital data storage device may encode a machine-executable program of instructions to perform one of the methods MET-MS, MET-BS1, MET-BS2.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for operating a first base station in a radio communication system comprising:
    transmitting, by an antenna array, first reference signals via a first radiation beam being directed towards a first direction and at least second reference signals via at least one second radiation beam being directed towards at least one second direction,
    receiving, for a handover of a mobile station from a second base station being a serving base station of said mobile station to said first base station, an indication for a radiation beam being selected from a group of radiation beams comprising said first radiation beam and said at least one second radiation beam for applying said selected radiation beam as an initial radiation beam at said first base station for serving said mobile station, and
    scheduling radio resources for said initial radiation beam for serving said mobile station based on said indication;
    wherein said indication comprises an identifier of said selected radiation beam; and
    wherein said indication further comprises quality information of said selected radiation beam.

2. Method according to claim 1, wherein said method further comprises after said handover of said mobile station from said second base station to said first base station:
    receiving from said mobile station further quality information for said first radiation beam and for said at least second radiation beam, and
    determining an alternative radiation beam for scheduling said mobile station based on said further quality information, when said alternative radiation beam provides a higher quality than said initial radiation beam.

3. Method according to claim 2, wherein said higher quality corresponds to a larger data throughput for scheduling said mobile station via said alternative radiation beam than scheduling said mobile station via said initial radiation beam.

4. Method according to claim 1, wherein said first radiation beam is aligned with respect to a first elevation angle and wherein said at least one second radiation beam is aligned with respect to at least one second elevation angle.

5. Method according to claim 4, wherein said first direction points to a first coverage area based on said first elevation angle, wherein said at least second direction points to at least one second coverage area based on said at least second elevation angle and wherein said first coverage area and said at least second coverage area are located at different radial positions within a radio cell of said first base station.

6. A method for operating a second base station in a radio communication system comprising:
    receiving, from a mobile station being served by said second base station, quality information about at least one of a first radiation beam directed by at least one first base station as a neighboring base station of said second base station towards a first direction and transmitted by an antenna array and of at least one second radiation beam directed by said at least one neighboring base station to at least one second direction and transmitted by said antenna array,
    determining, based on said quality information, a radiation beam from a group of radiation beams comprising said first radiation beam and said at least one second radiation beam as an initial serving radiation beam at said first base station for serving said mobile station after a handover from said second base station to said first base station, and
    transmitting an indication of said selected initial serving radiation beam to said first base station;
    wherein said indication comprises an identifier of said initial serving radiation beam; and
    wherein said indication further comprises quality information of said initial serving radiation beam.

7. A first base station for operation in a radio communication system comprising:
    a transmitter configured to transmit, by an antenna array, first reference signals via a first radiation beam being directed towards a first direction and at least second reference signals via at least one second radiation beam being directed towards at least one second direction,
    a receiver configured to receive, for a handover of a mobile station from a second base station being a serving base station of said mobile station to said first base station, an indication for a radiation beam being selected from a group of radiation beams comprising said first radiation beam and said at least one second radiation beam for applying said selected radiation beam as an initial radiation beam at said first base station for serving said mobile station, and
    a scheduler configured to schedule radio resources for said initial radiation beam for serving said mobile station based on said indication;
    wherein said indication comprises an identifier of said selected radiation beam; and
    wherein said indication further comprises quality information of said selected radiation beam.

8. A second base station for operation in a radio communication system comprising:
- a receiver, configured to receive, from a mobile station being served by said second base station, quality information about at least one of a first radiation beam being directed by at least one first base station as a neighboring base station of said second base station towards a first direction and transmitted by an antenna array and of at least one second radiation beam being directed by said at least one neighboring base station to at least one second direction and transmitted by said antenna array,
- a determiner configured to determine, based on said quality information, a radiation beam from a group of radiation beams comprising said first radiation beam and said at least one second radiation beam as an initial radiation beam at said first base station for serving said mobile station after a handover from said second base station to said first base station, and
- a transmitter configured to transmit an indication of said selected initial radiation beam to said first base station;
- wherein said indication comprises an identifier of said initial serving radiation beam; and
- wherein said indication further comprises quality information of said initial serving radiation beam.

* * * * *